Nov. 20, 1951     A. C. JAMES     2,575,664
OZONE GENERATOR
Filed July 29, 1949     2 SHEETS—SHEET 1
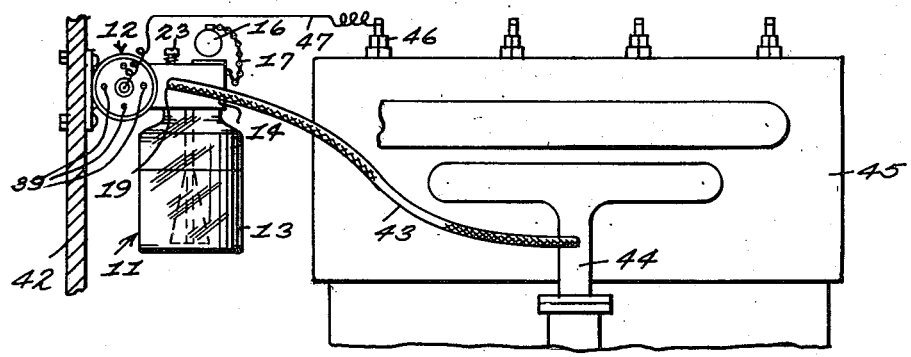
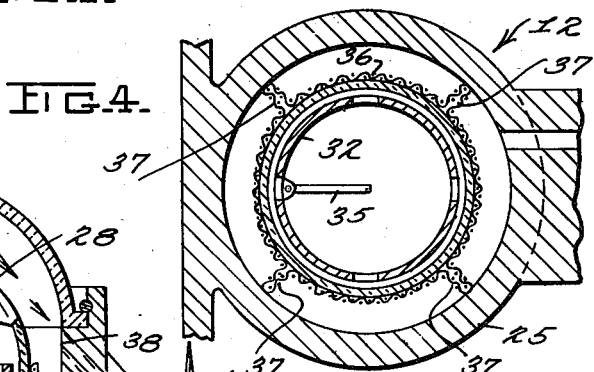
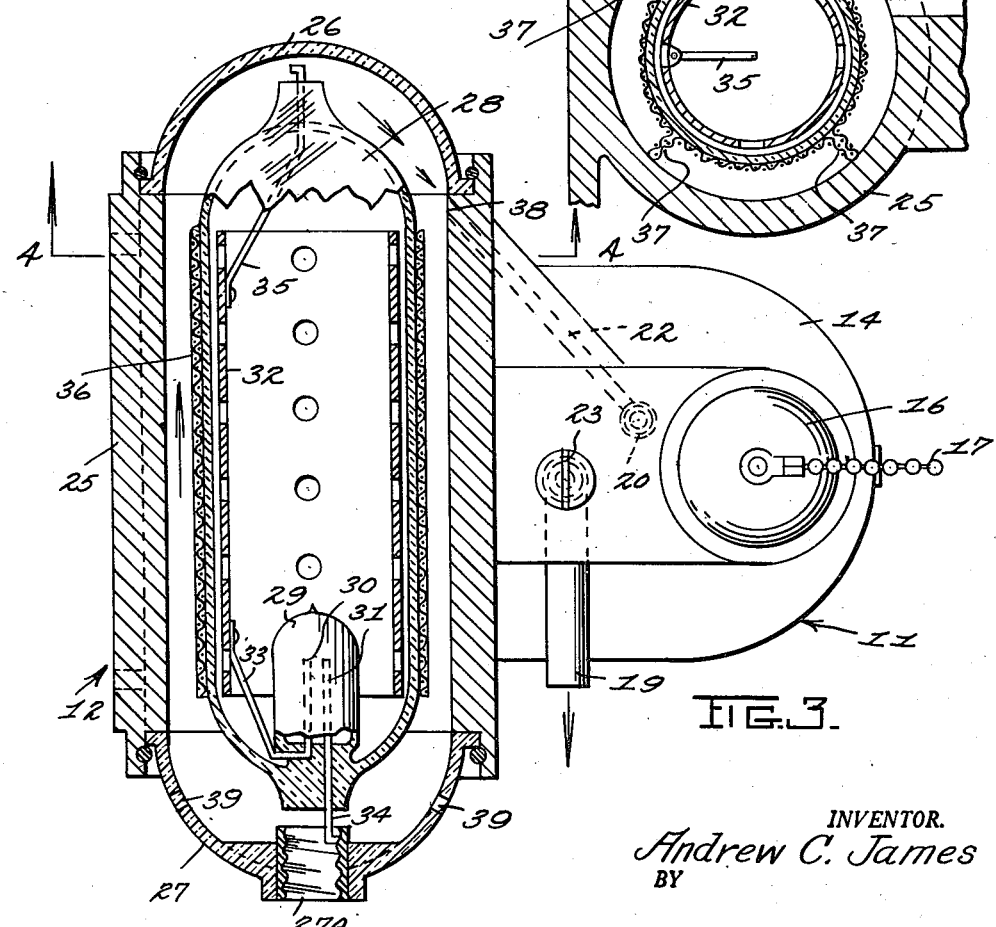
INVENTOR.
Andrew C. James
BY
McMorrow, Berman & Davidson
ATTORNEYS Nov. 20, 1951     A. C. JAMES     2,575,664
OZONE GENERATOR
Filed July 29, 1949     2 SHEETS—SHEET 2
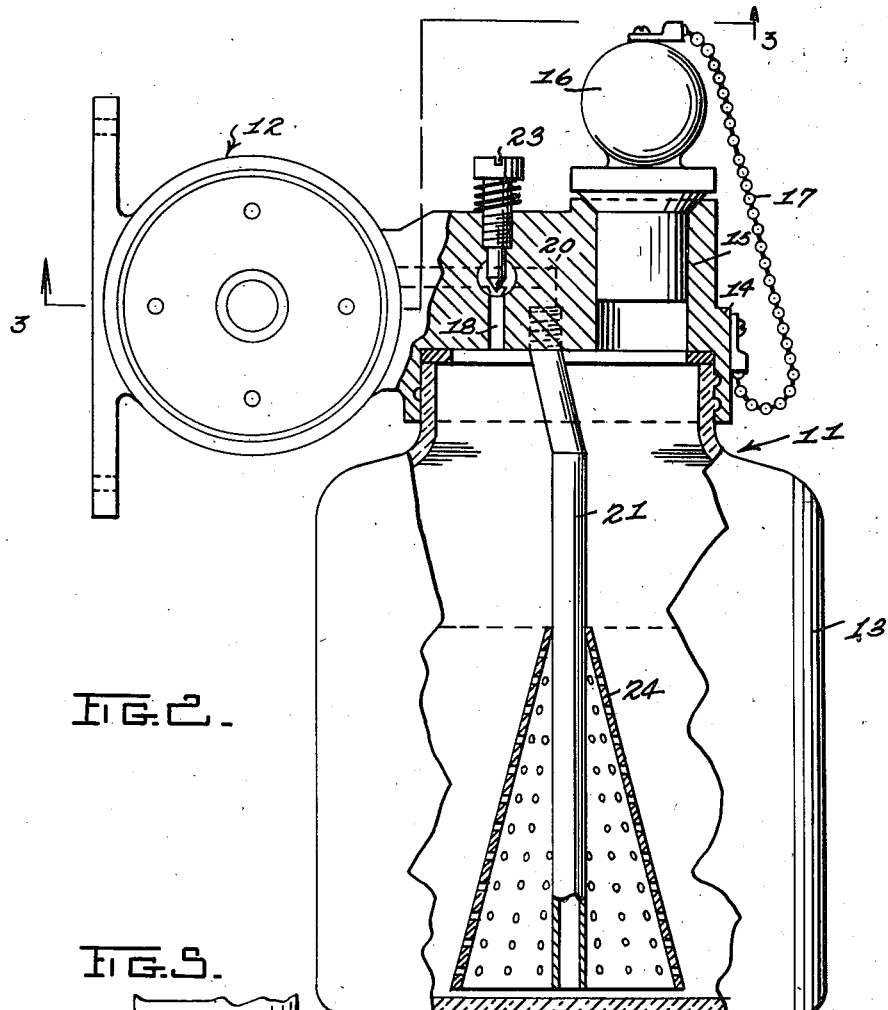
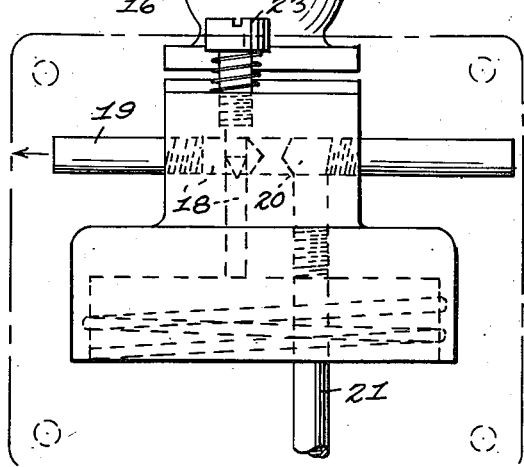
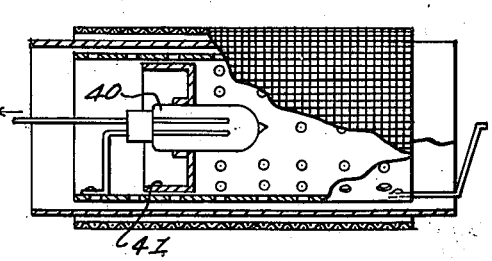
INVENTOR.
Andrew C. James
BY
McMorrow, Berman + Davidson
ATTORNEYS Patented Nov. 20, 1951

2,575,664

UNITED STATES PATENT OFFICE 2,575,664

OZONE GENERATOR

Andrew C. James, Alexandria, La.

Application July 29, 1949, Serial No. 107,547

1 Claim. (Cl. 204—316)

This invention relates to gasoline engines, and is more particularly concerned with means for improving the performance thereof by introducing into the intake manifold water vapor, ozone, or a mixture of both.

It is well known that the injection of water into the fuel mixture of gasoline engines results in an increase in delivered horsepower and a saving of fuel. The present invention provides means for introducing water vapor alone or mixed with ozone gas into the fuel mixture to provide additional advantages.

One of the objects and advantages of this invention is the removal and elimination of hard carbon which ordinarily forms in the motor and results in friction losses and the abnormal wearing of moving parts.

Another object and advantage of the invention is the reduction of oil consumption in the engine. The invention also results in the oil staying cleaner and lasting longer than it would under ordinary circumstances.

A further object of the invention is to prevent valves and piston rings from sticking.

A still further object is to prevent carbon from forming in the intake manifold of the engine and to increase carburation efficiency.

A still further object is the elimination of ping ordinarily caused by increased compression of pre-ignition and to obtain peak performance from the use of low octane gasoline.

A still further object is the elimination of carbon monoxide or a substantial portion of it resulting from the combustion of ordinary gasoline mixtures.

These and other objects and advantages of the invention will be apparent from the following description considered together with the accompanying drawing, in which drawing:

Figure 1 is a front elevational view of an embodiment of the invention shown attached to the intake manifold of a gasoline engine;

Figure 2 is an enlarged view of the embodiment shown in Figure 1, partly in section, detached from the engine;

Figure 3 is a plan section along the line 3—3 of Figure 2;

Figure 4 is a section along the line 4—4 of Figure 3;

Figure 5 is a fragmentary view of a portion of the upper part of the vaporizer unit, showing in dotted lines the piping and valve arrangement;

Figure 6 is a longitudinal cross-section of a modified form of the ozone generator elements.

Referring with more particularity to the drawing in which like numerals designate like parts, the embodiment illustrated comprises a vaporizer unit 11 and an ozone generator unit 12.

The vaporizer unit comprises a container 13, preferably of glass or some other suitable transparent material having an open top similar to that of an ordinary jar. The container carries a head 14 which screws on the top thereof and has a filling opening 15 on one side to pour water into the container. A stopper or plug 16 is removably disposed in the filling opening and is tethered to the head 14 by means of a chain 17 or other suitable means.

The head 14 contains an outlet passageway 18 which has one end communicating with the interior of the container and the other end open to the exterior where it is provided with a nipple 19.

An inlet passageway 20 through the head has one end connected to a dip tube 21 which extends downwardly to the bottom of the container. The other end of the passageway 20 is open to the exterior where it is connected to a channel 22 from the outlet of the ozone generator. The passageway 18 is provided with a suitable valve, such as the needle valve 23.

The dip tube 21 is provided with a perforated conical skirt or baffle 24 between the high water level line and the bottom of the dip tube.

The ozone generator comprises a cylindrical metallic housing body 25 which is preferably made integrally with the head 14 of the vaporizer unit. The open ends of the body 25 are closed with arcuate members 26 and 27, preferably of a transparent material, such as glass or plastic to form a closed housing. One of the arcuate members, say member 27, is provided with a central opening into which is set a metallic sleeve or socket 27A threaded along the inner wall to receive a plug on the end of an electrical wire. However, other suitable socket arrangements may be provided.

Within the cylindrical body 25 there is centrally disposed a vacuum chamber or tube 28 on the interior of which there is built in a gas-filled or glow-discharge tube 29 containing two spaced electrodes 30 and 31. The gas in the tube may be of any of the usual inert gases, such as neon, helium, argon, krypton, etc.

The inner wall of the vacuum chamber 28 is lined with a hollow open ended perforated plate or sleeve 32 which is spaced from the vacuum tube and connected to the electrode 30 of the gas tube by means of a conductor 33. The other electrode 31 is connected to the socket 27A by means of a conductor 34. The conductors 33 and 34 are sealed into the base of the gas tube, substantially as shown, so that the gas tube conducts a limited amount of electric current and serves as an indicator light.

The plate 32 is also connected to a conductor 35 at the opposite end of the vacuum chamber which passes through the end of the chamber and projects into the space between the outer wall of the chamber and the inner wall of the arcuate member 26. The conductor 35 is used when the vacuum chamber 28 is reversed, in which case said conductor may be connected to an independent spark coil.

The outer side wall of the chamber 28 is provided with a hollow open ended metallic shield 36 of wire cloth, screen, or perforated plate which surrounds and is in bearing contact with the tube 28. The shield is provided with longitudinally extending ribs 37 which contact the inner wall of the body 25 and thereby hold the vacuum chamber in spaced relation within said body.

Ozone is generated by the electrical brush discharged from the plate 32 onto member 36, and an outlet 38 is provided for the ozone which is connected to the channel 22. Inlets 39 for supplying fresh air to said space are provided through the arcuate member 27 at the other end of the body member.

In the modification illustrated in Figure 6, the ozone generator is of the open-grid type and the gas tube 40 is mounted independently on a bracket 41 instead of being integral with the vacuum chamber.

In normal operation of the device, it is conveniently mounted, such as on the engine panel 42 of an automobile. The nipple 19 is connected to one end of a pipe or hose 43, and the other end is connected to the intake manifold 44 of the engine 45. The terminal socket 27A is connected to one of the spark plugs 46 of the engine by a conductor 47 and water is placed in the container 13. By reversing the vacuum tube (or the open-type grid of Figure 6) so that wire 35 is connected to socket 27A, the conductor 47 may be connected to an independent spark coil in place of being connected to a spark plug of the engine. When the engine is started, ozone is generated in the ozone generator, as previously explained, and passes into the dip tube 21 through the passageway 22, whence it proceeds downwardly in the dip tube and emerges at the bottom thereof. As the ozone gas leaves the bottom of the dip tube it bubbles up through the water and becomes saturated with water, finally emerging from the surface of the water and passing into the outlet passageway 18, thence through the tube 43 into the intake manifold of the engine where it mingles with the fuel mixture before entering the combustion chambers. The amount of ozone gas and water vapor delivered to the manifold may be regulated by means of the valve 23.

If desired, the device may be operated without the ozone unit so as merely to supply water vapor to the manifold. This is done by disconnecting the conductor 47 from the socket 27A or from the spark plug 46. Also, the device may be operated by using the ozone gas generated without the water vapor. This is done by removing the water from the container 13 and permitting the gas to proceed directly into the manifold through the passageways.

The baffle 24 prevents the bubbling ozone from forcing unvaporized water in the chamber being carried upward into the passageway 18.

I claim:

An ozone generator comprising a closed cylindrical metallic housing having inlet and outlet ports adjacent opposite ends of said housing, a vacuum tube arranged longitudinally of and within said housing in spaced relation with respect to said housing, a hollow open ended perforated sleeve arranged longitudinally of and within said vacuum tube and spaced from the latter and fixedly supported in said latter, a perforated hollow open ended metallic shield surrounding and in bearing contact with said vacuum tube and spaced from said housing and secured to said vacuum tube, said shield being formed with a plurality of spaced longitudinally extending ribs interposed between and secured to said shield and housing for supporting said vacuum tube in position within said housing and electrically connecting said shield and said housing, a sealed gas-filled tube positioned within said vacuum tube adjacent one end thereof and fixedly secured therein, a pair of spaced electrodes in said gas-filled tube, one of said electrodes being connected to said sleeve, and means for connecting the other of said electrodes to a source of electrical energy.

ANDREW C. JAMES.

REFERENCES CITED

The following references are of record in the file of this patent:

UNITED STATES PATENTS

| Number | Name | Date |
|---|---|---|
| 1,257,053 | Warman | Feb. 19, 1918 |
| 1,600,951 | Scott | Sept. 21, 1926 |
| 1,839,876 | Hartman | Jan. 5, 1932 |
| 1,974,843 | Blashfield | Sept. 25, 1934 |
| 1,994,462 | Bueno | Mar. 19, 1935 |
| 2,082,363 | Stone | June 1, 1937 |